(12) United States Patent
Miyamoto et al.

(10) Patent No.: US 9,536,467 B2
(45) Date of Patent: *Jan. 3, 2017

(54) DISPLAY DEVICE

(71) Applicant: Japan Display Inc., Tokyo (JP)

(72) Inventors: Motoharu Miyamoto, Tokyo (JP); Takahiro Ochiai, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/883,338

(22) Filed: Oct. 14, 2015

(65) Prior Publication Data

US 2016/0035272 A1    Feb. 4, 2016

Related U.S. Application Data

(63) Continuation of application No. 14/161,723, filed on Jan. 23, 2014, now Pat. No. 9,190,007.

(30) Foreign Application Priority Data

Jan. 23, 2013 (JP) ................. 2013-010237

(51) Int. Cl.
    *G09G 3/20*    (2006.01)
    *G09G 3/36*    (2006.01)

(52) U.S. Cl.
    CPC .......... *G09G 3/2096* (2013.01); *G09G 3/3677* (2013.01); *G09G 2300/0426* (2013.01); *G09G 2310/065* (2013.01)

(58) Field of Classification Search
    CPC .. H03K 17/162; H03K 17/16; G09G 2330/12; G09G 2310/0286; G09G 3/3685; G09G 3/3688;G09G 3/3692; G09G 2310/0243; G09G 2310/08; G09G 3/3696; G09G 2300/0866; G09G 2300/0861; G09G 2300/0857; G09G 2300/0852; G09G 2300/0847; G09G 2300/0842
    USPC .......................................... 345/208, 76, 100
    See application file for complete search history.

(56) References Cited

U.S. PATENT DOCUMENTS

| | | | |
|---|---|---|---|
| 6,345,085 B1 | 2/2002 | Yeo et al. | |
| 6,876,353 B2 | 4/2005 | Morosawa et al. | |
| 7,038,653 B2 | 5/2006 | Moon | |
| 8,605,028 B2 * | 12/2013 | Sakamoto | G09G 3/3677 345/100 |

(Continued)

FOREIGN PATENT DOCUMENTS

JP    2007-095190 A    4/2007

*Primary Examiner* — Grant Sitta
(74) *Attorney, Agent, or Firm* — Typha IP LLC

(57) ABSTRACT

A circuit block of a driving circuit of a display device includes a first transistor that has a gate being connected to a first node having an active potential during an output period, and controls electrical conduction between a first clock signal line being applied with a first clock signal and the scanning signal line, a second transistor that has a gate being connected to a second node having an active potential during a non-output period, and controls electrical conduction between the first node and an inactive potential line, and a third transistor that has a gate being connected to the first node, and controls electrical conduction between the second node and a first cyclic signal line applied with a first period signal having an active potential at the time of termination of the output period.

10 Claims, 15 Drawing Sheets

(56) References Cited

U.S. PATENT DOCUMENTS

| | | | |
|---|---|---|---|
| 8,643,584 B2 | 2/2014 | Han et al. | |
| 8,803,782 B2 | 8/2014 | Ochiai et al. | |
| 9,190,007 B2 * | 11/2015 | Miyamoto | G09G 3/3677 |
| 2004/0217935 A1 | 11/2004 | Jeon et al. | |
| 2006/0262074 A1 | 11/2006 | Shimoda | |
| 2007/0040793 A1 | 2/2007 | Kim et al. | |
| 2007/0070020 A1 | 3/2007 | Edo et al. | |
| 2011/0310074 A1 | 12/2011 | Ochiai et al. | |
| 2012/0113089 A1 * | 5/2012 | Yang | G09G 3/3648 |
| | | | 345/213 |

\* cited by examiner

DISPLAY DEVICE

CROSS-REFERENCE TO RELATED APPLICATION

This application is a continuation of U.S. patent application Ser. No. 14/161,723, filed on Jan. 23, 2014, which claims priority from Japanese Patent Application No. 2013-010237 filed on Jan. 23, 2013, the entire contents of which are incorporated herein by reference.

BACKGROUND OF THE INVENTION

1. Field of the Invention

The present invention relates to a display device.

2. Description of the Related Art

Liquid crystal display devices are widely used as information communication terminals or television receivers. In addition, organic electroluminescence display devices (OLEDs) are also known as thin display devices.

Liquid crystal display devices are devices that change the orientation of a liquid crystal composition sealed between two substrates by changing an electric field and control transmittance of light passing through a liquid crystal panel to display an image. In display devices, including such a liquid crystal display device, which apply a voltage corresponding to a predetermined gray-scale value to pixels of a screen, a pixel transistor for applying the voltage corresponding to the gray-scale value to the pixels is disposed. In general, a gate of a pixel transistor which corresponds to one line of a screen is connected to one signal line (hereinafter, referred to as "scanning signal line"), and the scanning signal line is controlled to output an active voltage for sequentially allowing electrical conduction of the pixel transistor to the respective lines by a driving circuit.

JP 2007-095190 A discloses a shift register circuit that stably operates with a low power consumption.

SUMMARY OF THE INVENTION

In a thin film transistor used in the above-described driving circuit, it is known that a threshold voltage of a gate for allowing electrical conduction between a source and a drain is shifted due to a prolonged electrical conduction. A waveform of a signal, output from such a transistor in which a shift occurs in a threshold voltage, is distorted due to a delay in a response time, which leads to a concern for an operational problem, such as an erroneous output to a scanning signal line or a reduction in an available driving frequency in the driving circuit.

The invention is contrived in view of such situations, and an object thereof is to provide a display device that maintains an appropriate output to a scanning signal line even though a threshold shift occurs in a transistor of a driving circuit.

According to an aspect of the present invention, there is provided a display device including a plurality of scanning signal lines that are disposed side by side within a rectangular display region so as to be parallel to one side of the rectangle, and are applied with an active potential which is a potential for allowing electrical conduction of a pixel transistor; and a driving circuit that sequentially applies the active potential from one ends of the plurality of scanning signal lines disposed side by side. The driving circuit has multiple stages of circuit blocks which are circuits applying an active potential to the plurality of scanning signal lines. At least one stage of the circuit block in the multiple stages of circuit blocks includes a first transistor that has a gate being connected to a first node having an active potential during an output period including a period in which the active potential is applied to the corresponding scanning signal line, and controls electrical conduction between a first clock signal line being applied with a first clock signal and the scanning signal line, a second transistor that has a gate being connected to a second node having an active potential during a non-output period which is a period other than the output period, and controls electrical conduction between the first node and an inactive potential line fixed to an inactive potential, and a third transistor that has a gate being connected to the first node, and controls electrical conduction between the second node and a first cyclic signal line applied with a first cyclic signal having an active potential at the time of termination of the output period.

In the aspect, in the display device of the present invention, the first cyclic signal may be a clock signal other than the first clock signal in multiphase clock signals including the first clock signal.

In the aspect, in the display device of the present invention, the first cyclic signal may be an output to the scanning signal line of the circuit block of another stage.

In the aspect, in the display device of the present invention, the first cyclic signal line may be connected to the third transistor through diode connection.

In the aspect, in the display device of the present invention, the driving circuit may be a bidirectional driving circuit that sequentially applies the active potential in one direction selected from a forward direction from the one ends of the plurality of scanning signal lines and a backward direction from the other ends thereof. The circuit block may further include a fourth transistor that has a gate being connected to the first node and controls electrical conduction between the second node and a second cyclic signal line applied with a second cyclic signal having an active potential at the time of termination of an output period in a reverse direction. In this case, the second cyclic signal may be the same signal as the first cyclic signal.

DETAILED DESCRIPTION OF THE INVENTION

Figure 1:
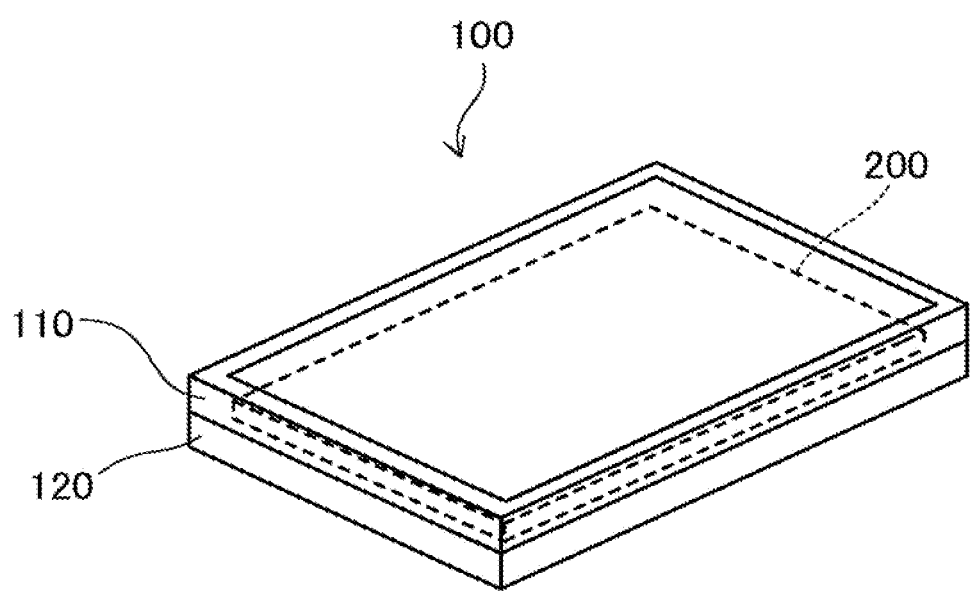
FIG. 1 is a schematic diagram of a liquid crystal display device according to a first embodiment of the present invention.

Hereinafter, first and second embodiments of the present invention will be described with reference to the accompanying drawings. Meanwhile, in the drawings, the same or similar components are denoted by the same reference numerals and signs, and a repeated description will be omitted.

First Embodiment

FIG. 1 schematically illustrates a liquid crystal display device 100 according to a first embodiment of the present invention. As illustrated in FIG. 1, the liquid crystal display device 100 includes a liquid crystal panel 200 which is fixed so as to be sandwiched between an upper frame 110 and a lower frame 120, a backlight device not shown in the drawing, and the like.

Figure 2:
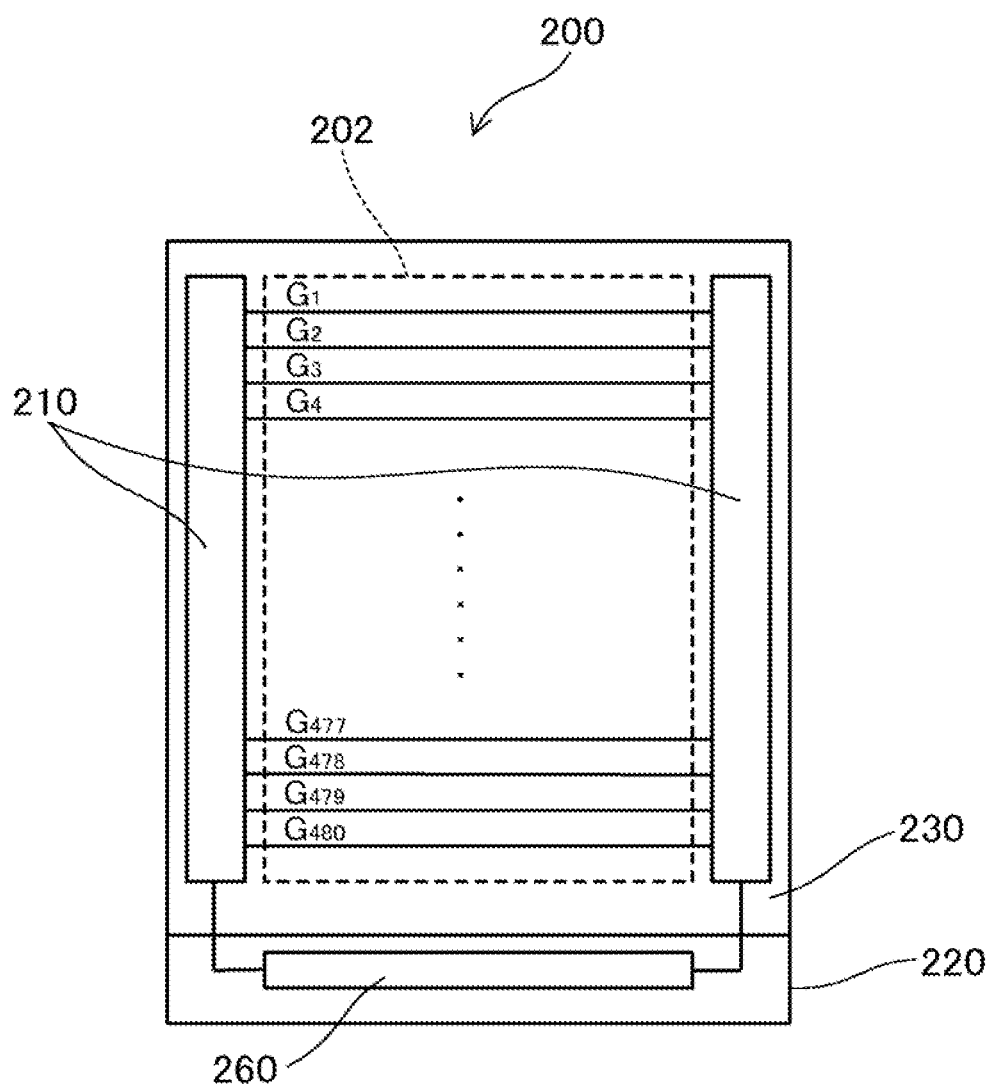
FIG. 2 is a diagram illustrating a configuration of a liquid crystal panel of FIG. 1.

FIG. 2 illustrates a configuration of the liquid crystal panel of FIG. 1. The liquid crystal panel 200 includes two substrates of a thin film transistor (TFT) substrate 220 and a color filter substrate 230, and a liquid crystal composition is sealed between these substrates. The TFT substrate 220 includes a driving circuit that sequentially applies a High potential, which is an active potential for allowing electrical conduction between a source and a drain in a TFT of each pixel, to scanning signal lines G1 to G480, and a driving integrated circuit (IC) 260 that applies a voltage corresponding to a gray-scale value of the pixel to a plurality of data signal lines, not shown in the drawing, extending so as to be vertically perpendicular to the scanning signal lines G1 to G480 in a pixel region 202 and controls the driving circuit 210.

Figure 3:
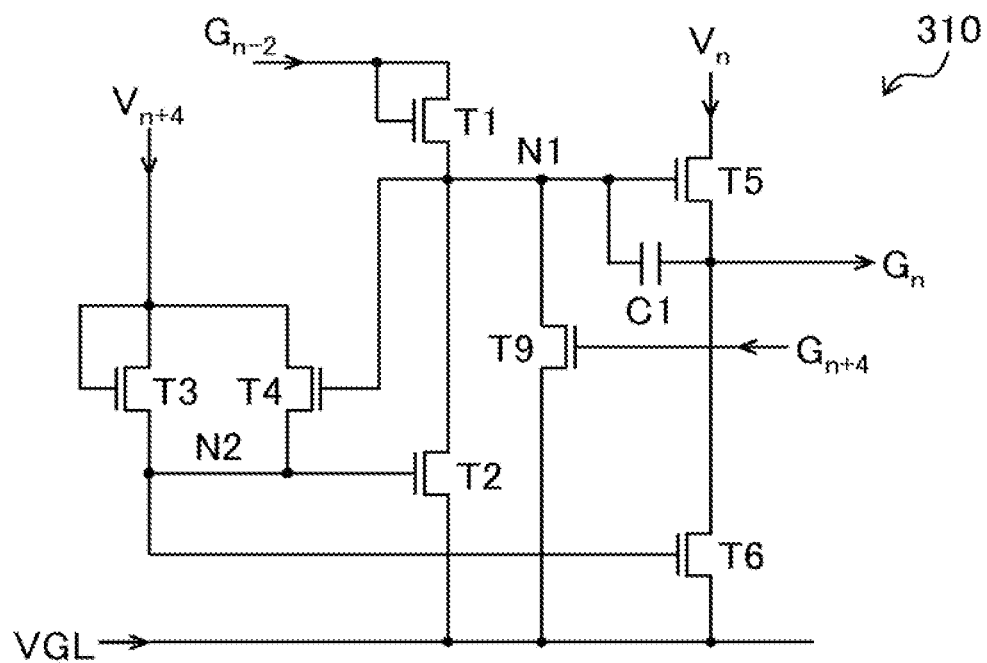
FIG. 3 is a circuit diagram of a circuit block constituting a driving circuit of FIG. 2.
Figure 4:
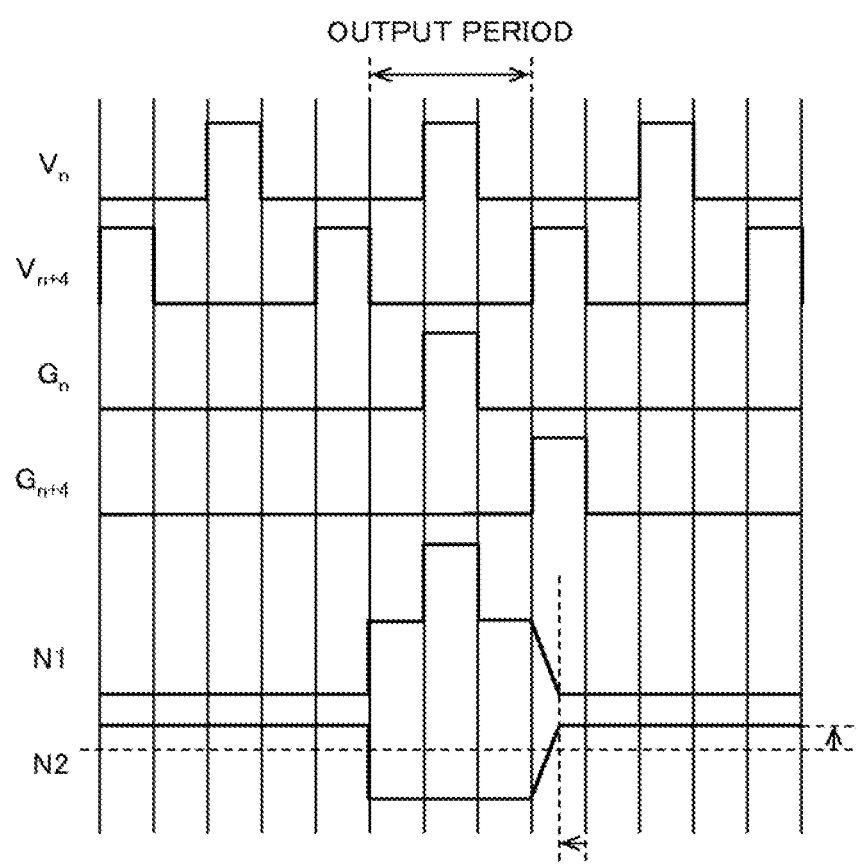
FIG. 4 is a timing chart of an operation of the circuit block of FIG. 3.

FIG. 3 is a circuit diagram of a circuit block 310 constituting the driving circuit 210. A plurality of the circuit blocks 310 are disposed within the driving circuit 210, and each of the circuit blocks 310 sequentially applies a High potential to the scanning signal lines G1, G2, . . . G480. FIG. 3 illustrates the circuit block that outputs a signal to the n-th scanning signal line Gn. FIG. 4 is a timing chart of an operation of the circuit block 310 of FIG. 3. In FIG. 3 and FIG. 4, the driving circuit 210 is operated by eight-phase clock signals of V1 to V8, but the driving circuit may be operated by four-phase or other multiphase clock signals. A potential of a VGL is fixed to a Low potential (inactive potential).

An operation of the circuit block 310 of FIG. 3 will be described using the timing chart of FIG. 4. First, in a period other than an output period, a clock signal Vn+4 cyclically has a High potential, and thus a node N2 diode-connected in a transistor T3 is charged and maintains a High potential. The node N2 is connected to a gate of a transistor T2 to allow the electrical conduction of the transistor T2, and thus a node N1 is connected to the VGL to maintain a Low potential.

When a High potential of a scanning signal line Gn−2 which is an output of a stage before the previous stage is input to a transistor T1 which is diode-connected, the node N1 connected to the transistor has a High potential. A gate of a transistor T4 has a High potential by the node N1 being set to be in a High state, and thus the transistor T4 is set to be in an electrical conduction state. Accordingly, the node N2 is connected to the clock signal Vn+4 having a Low potential at the same timing, and thus the node has a Low potential. In addition, the transistor T5 is set to be in an electrical conduction state by the node N1 having a High potential, and thus a potential difference occurs in a capacitor C1.

Next, when a clock signal Vn is set to be in a High state, one electrode of the capacitor C1 has a High potential by the transistor T5 being set to be in an electrical conduction state, and thus a gate potential of the transistor T5 which is the other electrode side is further boosted by a so-called bootstrap. Thus, a High potential of an output to the scanning signal line Gn is established. A data signal voltage based on the gray-scale value of each pixel is applied to a data signal line not shown in the drawing, during a writing period in which the scanning signal line Gn has a High potential.

When the clock signal Vn has a Low potential, the scanning signal line Gn also has a Low potential in association with the clock signal having a Low potential. In order to establish this, the clock signal Vn+4 having a High potential at this time is input to the transistor T3 which is diode-connected to make the node N2 have a High potential. A transistor T6 having a gate being connected to the node N2 having a High potential allows electrical conduction between the scanning signal line Gn and the VGL to make the scanning signal line Gn have a Low potential. The data signal voltage based on the applied gray-scale value is held in the pixel by the fall of the scanning signal line Gn. In addition, similarly, the transistor T2 having a gate being connected to the node N2 allows electrical conduction between the node N1 and the VGL to make the node N1 have a Low potential. Furthermore, the scanning signal line Gn+4 having a High potential is input to a gate of a transistor T9 to allow electrical conduction between the node N1 and the VGL, and thus the node N1 is set to be in a Low state.

Figure 5:
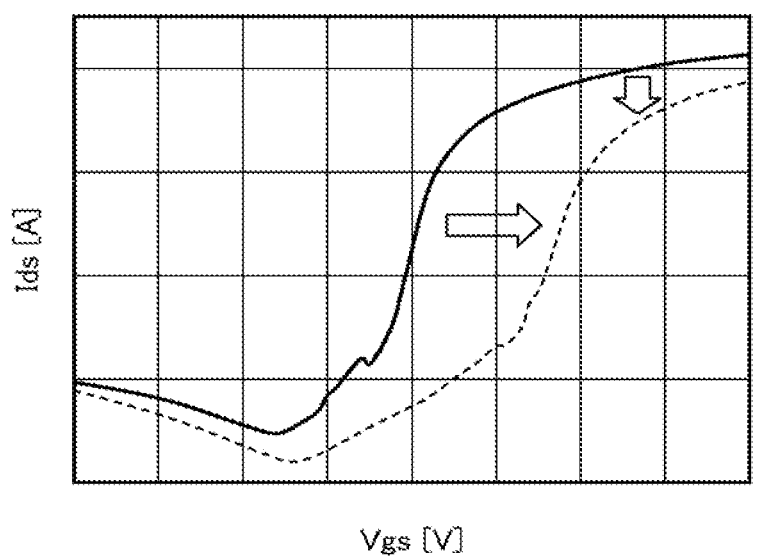
FIG. 5 is a graph illustrating a relation between a gate voltage of a transistor and a current between a source and a drain.
Figure 6:
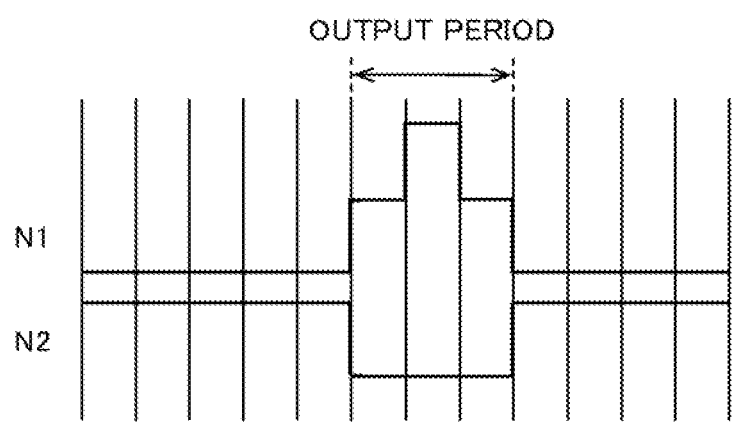
FIG. 6 is a timing chart illustrating ideal changes in nodes in an output period.
Figure 7:
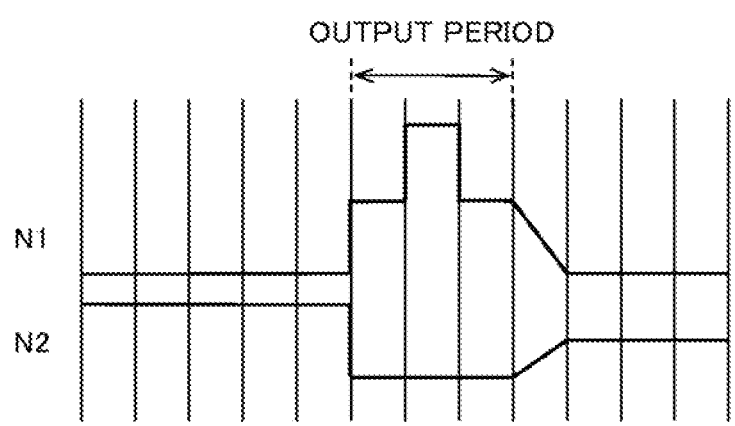
FIG. 7 is a timing chart illustrating changes in the nodes after a threshold shift of transistors in an output period.

Here, a case where a shift occurs in threshold voltages of the transistors T2 and T6 will be considered. FIG. 5 is a graph illustrating a relation between a gate voltage Vgs of the transistor T2 or T6 and a current Ids between a source and a drain, and a wavy line indicates a state after a long period of use. As illustrated in this graph, in the transistors T2 and T6, the threshold voltage is shifted to a positive side due to a long period of use, and an ON current flowing during an electrical conduction state decreases. FIG. 6 is a timing chart illustrating ideal changes in the node N1 and the node N2 in an output period. FIG. 7 is a timing chart illustrating changes in the node N1 and node N2 after a threshold shift of the transistors T2 and T6 in an output period. As illustrated in this graph, a delay in the rise of the node N2 is a delay in the fall of the node N1. Thus, when the node N1 is set to be at a timing of the next signal where the node does not sufficiently fall, an erroneous output occurs at a timing other than the original output timing.

In this embodiment, as illustrated in FIG. 3, the transistor T4 having a gate being connected to the node N1 is connected to the clock signal Vn+4. Thus, even though the transistor T4 is still in an electrical conduction state due to insufficient fall of the node N1, the node N2 has a potential changing in compliance with the clock signal Vn+4 that rises at the time of the termination of the output period, and thus the precipitous rise of the node N2 can be realized.

For example, even though a shift occurs in the threshold voltages of the transistors T2 and T6, the precipitous rise of the node N2 can accelerate the response of the transistors T2 and T6, and thus the node N1 is fallen to improve the response. Therefore, since it is possible to prevent the erroneous output to the scanning signal line Gn, an appropriate output to the scanning signal line Gn can be maintained, and thus the stability of the driving circuit can be increased. In addition, since the response speed of the whole circuit is increased, a drive frequency of the driving circuit can be increased.

Figure 8:
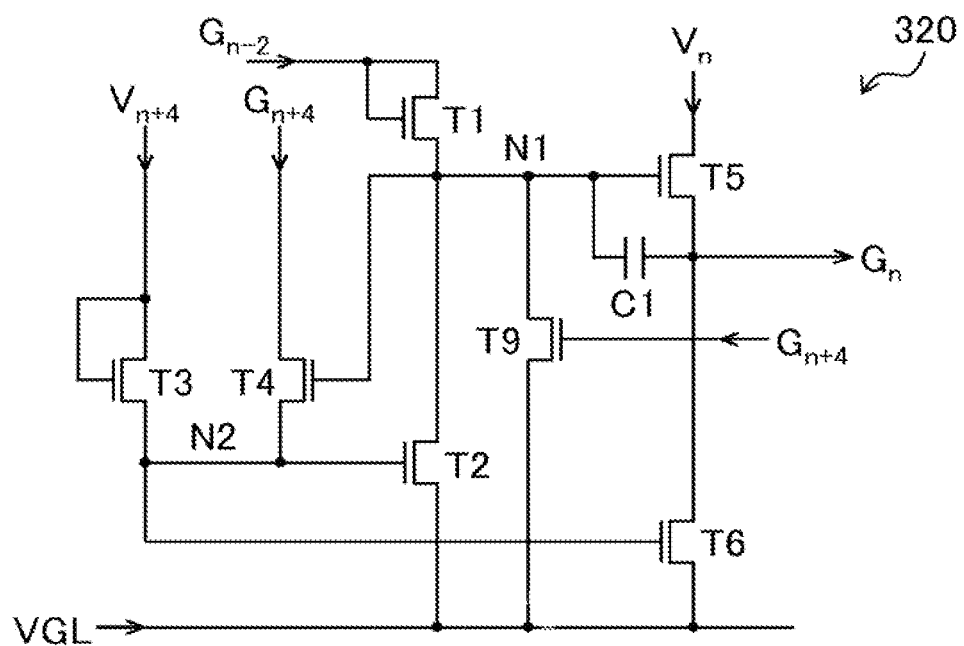
FIG. 8 is a circuit diagram of a circuit block which is a first modified example of the circuit block of FIG. 3.

FIG. 8 illustrates a circuit diagram of a circuit block 320 which is a first modified example of the circuit block 310 of FIG. 3. A difference from the circuit block 310 is that a transistor T4 having a gate being connected to a node N1 is connected to an output of a scanning signal line Gn+4 rather than a clock signal Vn+4. Even in such a configuration, a signal to be applied to the scanning signal line Gn+4 is a signal having a High potential only at the time of the termination of an output period of a scanning signal line Gn, and thus effects similar to those of the circuit block 310 of FIG. 3 can be obtained.

Figure 9:
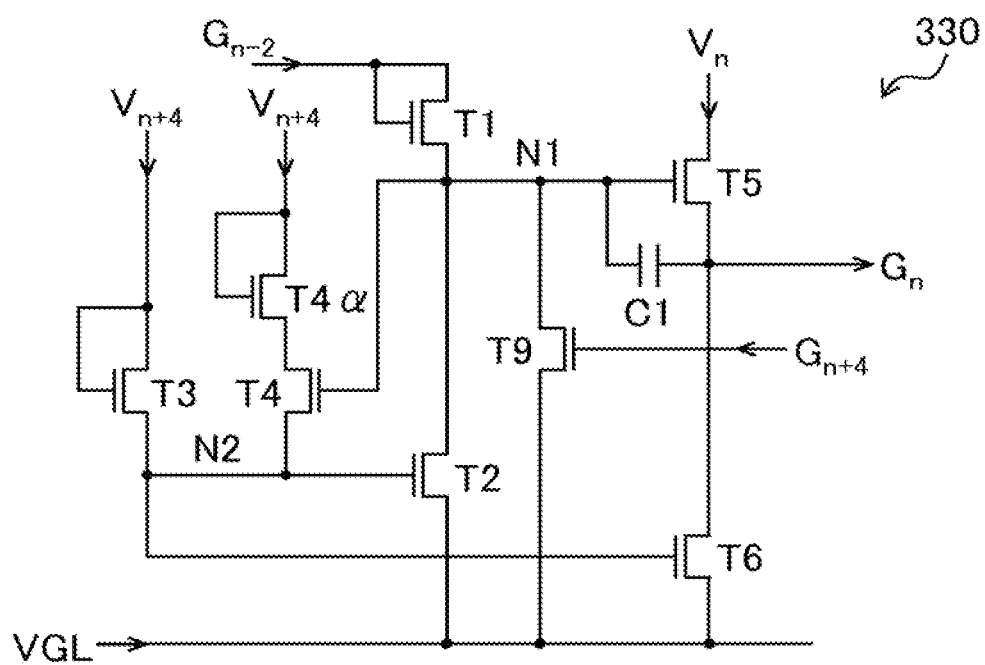
FIG. 9 is a circuit diagram of a circuit block which is a second modified example of the circuit block of FIG. 3.

FIG. 9 illustrates a circuit diagram of a circuit block 330 which is a second modified example of the circuit block 310 of FIG. 3. A difference from the circuit block 310 is that a transistor T4α which is diode-connected is present between a transistor T4 and a clock signal Vn+4. Even in such a configuration, effects similar to those of the circuit block 310 are obtained, and a potential of a node N1 does not sufficiently fall to a Low potential after the elapse of an output period, or an unexpected rise in the potential of the node N1 occurs in a period other than the output period. Thus, even in a case where the transistor T4 is partially set to be in an electrical conduction state, it is possible to prevent the clock signal Vn+4 from being connected to a node N2.

Figure 10:
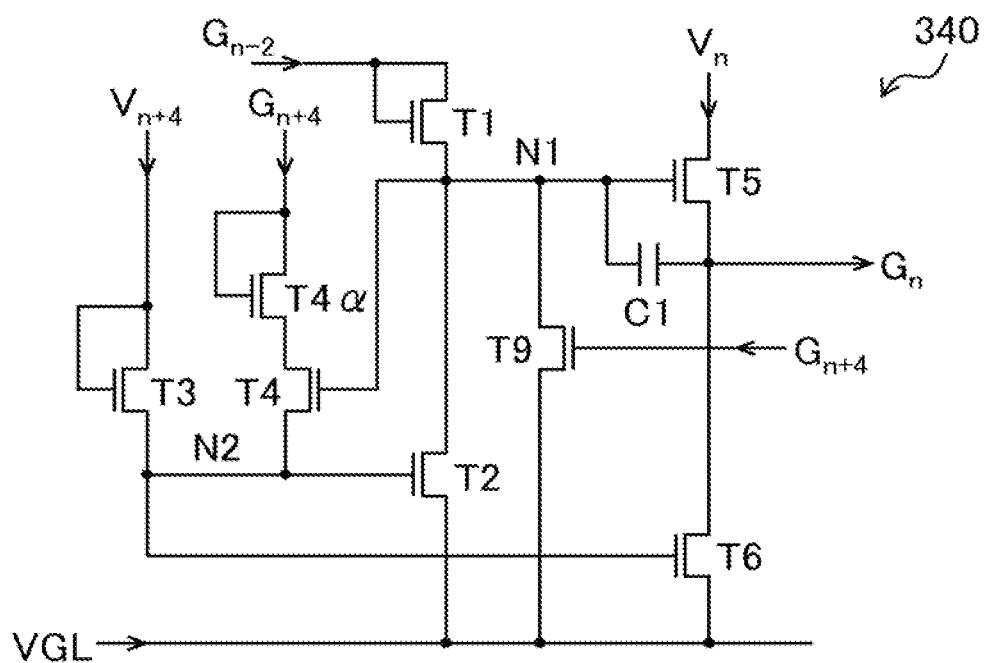
FIG. 10 is a circuit diagram of a circuit block which is a third modified example of the circuit block of FIG. 3.

FIG. 10 illustrates a circuit diagram of a circuit block 340 which is a third modified example of the circuit block 310 of FIG. 3. A difference from the circuit block 330 of FIG. 9 is that a signal connected to a transistor T4α is connected to a scanning signal line Gn+4 rather than a clock signal Vn+4. Even in such a configuration, effects similar to those of the circuit block 330 of FIG. 9 can be obtained.

Second Embodiment

A second embodiment of the present invention will be described below. A configuration of a liquid crystal display device according to the second embodiment is similar to the configurations illustrated in FIG. 1 and FIG. 2 according to the first embodiment, and thus a repeated description will be omitted. Here, a driving circuit 210 is a driving circuit capable of bidirectional scanning.

Figure 11:
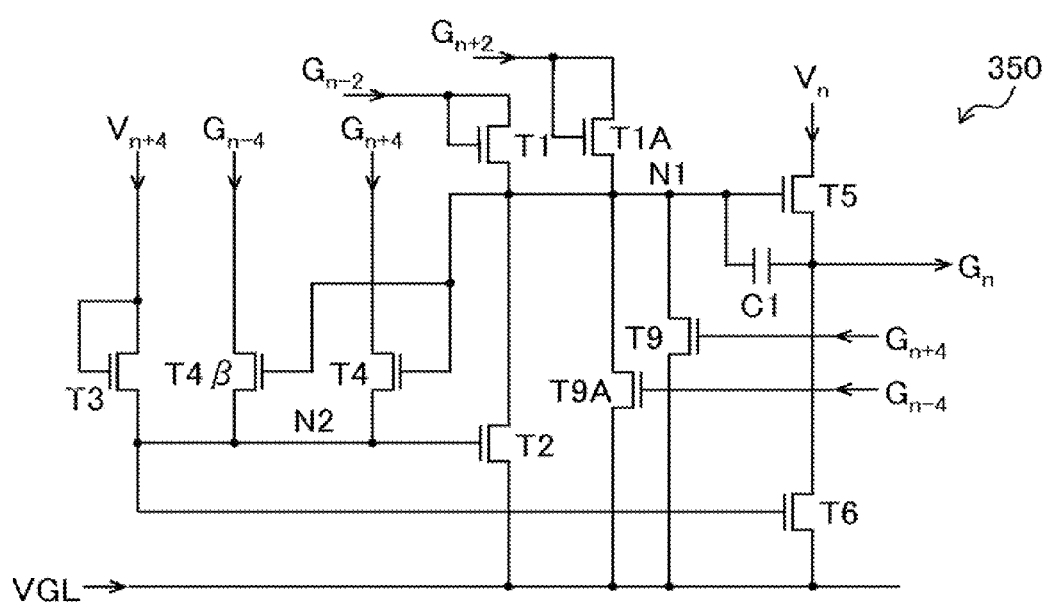
FIG. 11 is a circuit diagram of a circuit block constituting a driving circuit according to a second embodiment of the present invention.
Figure 12:
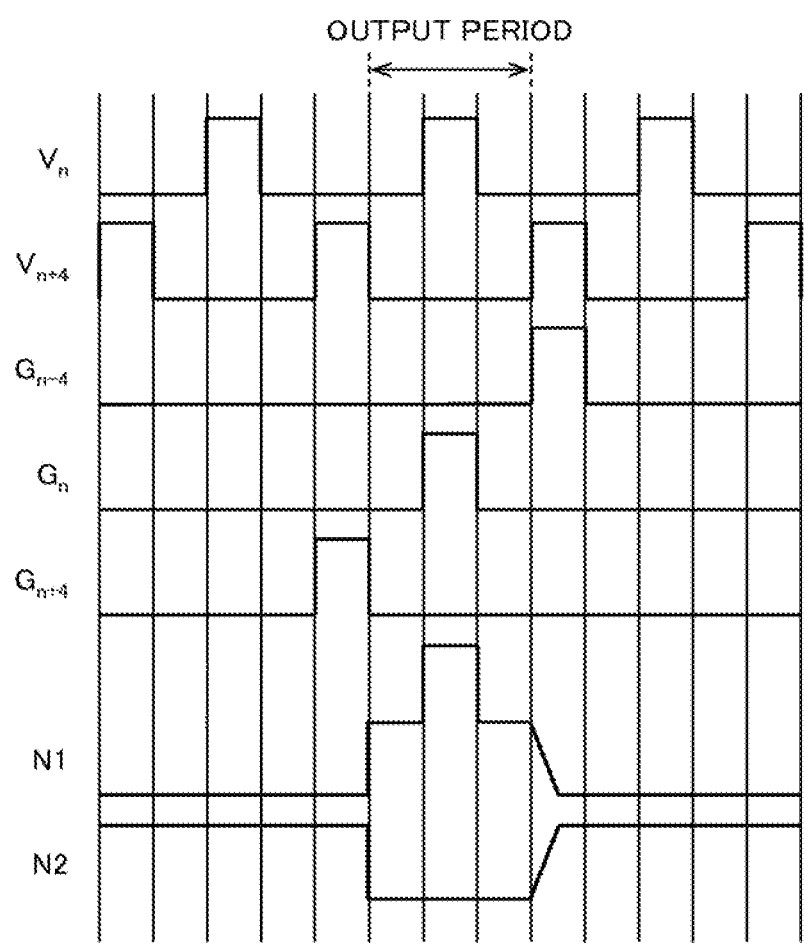
FIG. 12 is a timing chart of an operation of the circuit block during backward scanning.

FIG. 11 illustrates a circuit diagram of a circuit block 350 constituting a driving circuit. FIG. 12 illustrates a timing chart of the circuit block 350 of FIG. 11. A difference from the circuit block 310 is that a transistor T1A for inputting a scanning signal line Gn+2 serving as a trigger when backward scanning is performed, a transistor T9A for inputting a signal of a scanning signal line Gn−4, and a transistor T4β controlling the connection between the scanning signal line Gn−4 and a node N2 by using a node N1 as a gate are arranged. The transistor T1A and the transistor T9A are transistors that take on the same roles during backward scanning as a transistor T1 and a transistor T9 during forward scanning, respectively, and the transistor T4β is a transistor that takes on the same role during backward scanning as a transistor T4 during forward scanning, and thus the detailed description thereof will be omitted. FIG. 12 illustrates a timing chart of an operation of the circuit block 310 during backward scanning.

In this embodiment, as illustrated in FIG. 11 and FIG. 12, since a transistor T4γ having a gate being connected to the node N1 is connected to the scanning signal line Gn−4. Thus, even though the transistor T4γ is still in an electrical conduction state due to insufficient fall of the node N1, the node N2 has a potential changing in compliance with a signal of the scanning signal line Gn−4, and thus the precipitous rise of the node N2 can be realized. Thus, even in scanning in a reverse direction in the circuit block capable of bidirectional scanning, effects similar to those in the first embodiment can be obtained.

Figure 13:
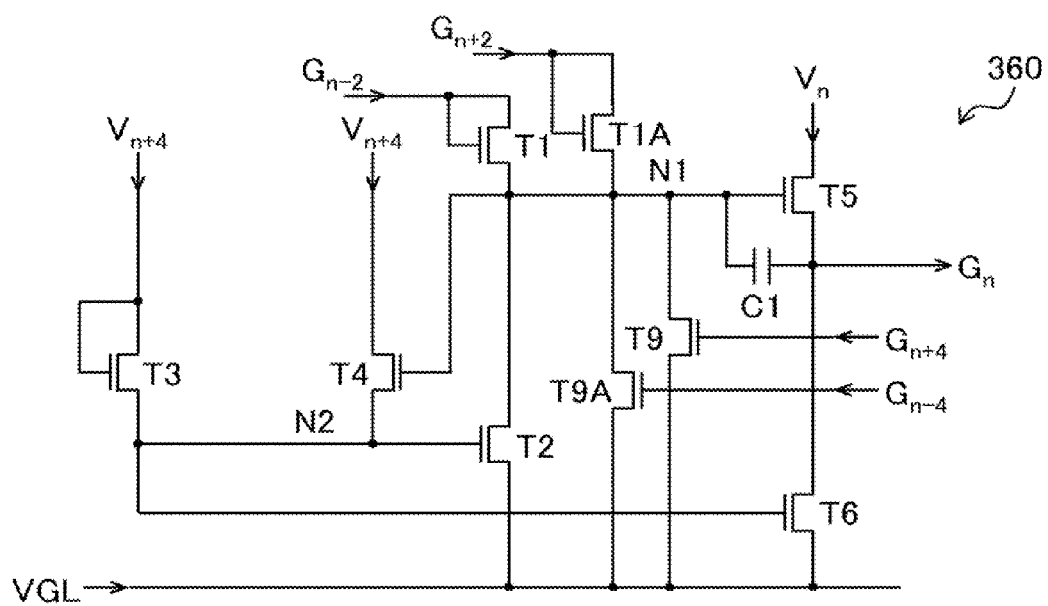
FIG. 13 is a circuit diagram of a circuit block which is a first modified example of the circuit block of FIG. 11.

FIG. 13 illustrates a circuit diagram of a circuit block 360 which is a first modified example of the circuit block 350 of FIG. 11. A difference from the circuit block 350 is that a transistor T4 is connected to a clock signal Vn+4 rather than a scanning signal line Gn+4 and that a transistor T4β is not present. In such a configuration, as illustrated in each of the timing charts of FIG. 4 and FIG. 12, in any case of forward scanning or backward scanning, a signal of the clock signal Vn+4 has a High potential after an output period, and thus effects similar to those in the case of the circuit block 350 of FIG. 11 can be obtained.

Figure 14:
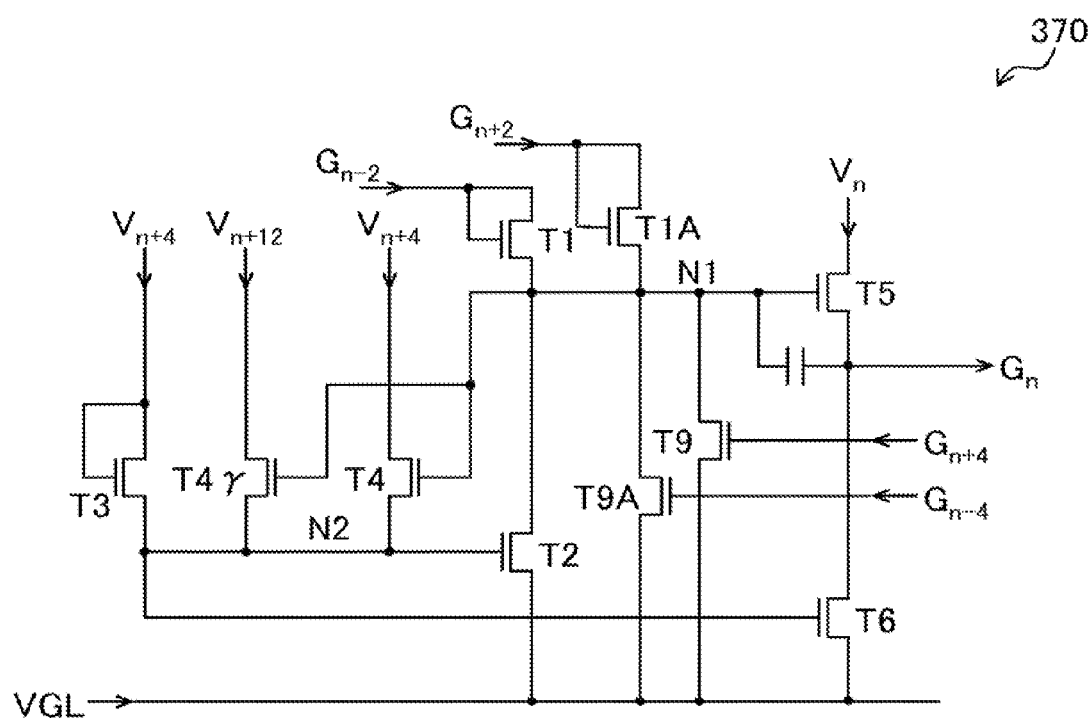
FIG. 14 is a circuit diagram of a circuit block which is a second modified example of the circuit block of FIG. 11.
Figure 15:
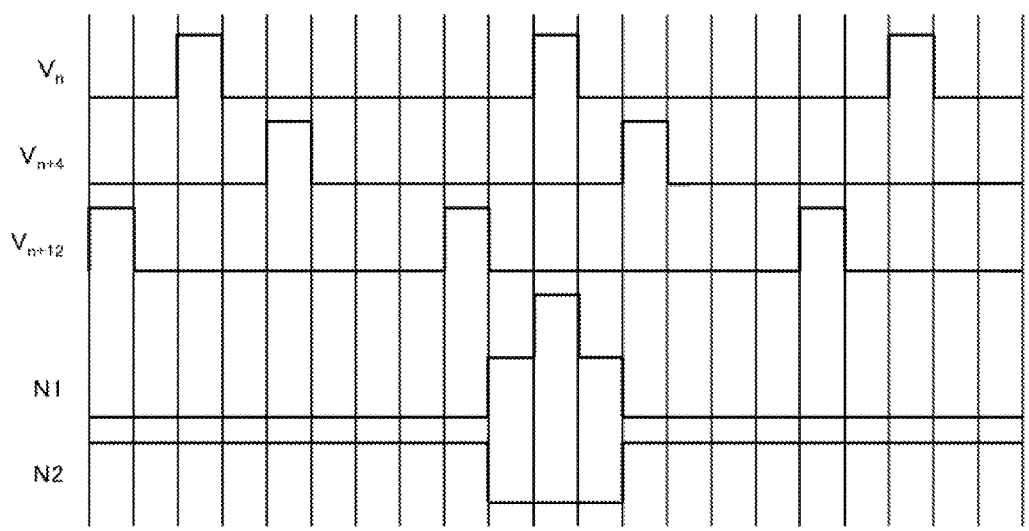
FIG. 15 is a timing chart of an operation of the circuit block of FIG. 14.

FIG. 14 illustrates a circuit block 370 which is a modified example of the circuit block 350 of FIG. 11. A difference from the circuit block 360 of FIG. 13 is that sixteen-phase clock signals are used. In this case, as illustrated in a timing chart of FIG. 15, a clock signal having a High potential immediately after an output period during backward scanning is Vn+12, and thus a transistor T4β controlling the connection between this signal line and the node N2 is disposed. Even in such a configuration, effects similar to those of the circuit block 350 of FIG. 11 can be obtained during both forward scanning and backward scanning.

In addition, any one of an in-plane switching (IPS) type, vertically aligned (VA) type, and twisted nematic (TN) type liquid crystal display devices can be used as the liquid crystal display device of each of the above-described embodiments. In addition, the present invention is not limited to the liquid crystal display device, and can be used in other display devices, such as an organic EL display device, which use a driving circuit that sequentially applies an active potential to lines.

While there have been described what are at present considered to be certain embodiments of the present invention, it will be understood that various modifications may be made thereto, and it is intended that the appended claim cover all such modifications as fall within the true spirit and scope of the invention.

What is claimed is:

1. A display device comprising:
   a plurality of pixels
   a plurality of scanning signal lines supplying a scanning signal to the plurality of pixels respectively,
   a driving circuit sequentially applying the scanning signal from one ends of the plurality of scanning signal lines,
   a first clock signal line supplying a first clock signal to the driving circuit,
   a third clock signal line supplying a third clock signal to the driving circuit,
   wherein the driving circuit has multiple stages of circuit blocks which output the scanning signal to the plurality of scanning signal lines,
   wherein at least one stage of the circuit block in the multiple stages of circuit blocks includes, a first transistor that has a gate being connected to a first node having an active potential during an output period including a period in which the scanning signal is applied to the corresponding scanning signal line, and controls electrical conduction between the first clock signal line and the scanning signal line, a second transistor that has a gate being connected to a second node having an active potential during a non-output period which is a period other than the output period, and controls electrical conduction between the first node and an inactive potential line fixed to an inactive potential, and a third transistor that has a gate being connected to the first node, and controls electrical conduction between the second node and the third clock signal line, a fourth transistor that is diode-connected between the third clock signal line and the second node, wherein the third clock signal has an active potential at the time of termination of the output period and an inactive potential during the output period.

2. The display device according to claim 1, wherein the third clock signal is a clock signal other than the first clock signal in multiphase clock signals including the first clock signal.

3. The display device according to claim 1, wherein the third clock signal is an output to the scanning signal line of the circuit block of another stage.

4. The display device according to claim 1, wherein the third clock signal line is connected to the third transistor through diode connection.

5. The display device according to claim 1,
wherein the driving circuit is a bidirectional driving circuit that sequentially applies the active potential in one direction selected from a forward direction from the one ends of the plurality of scanning signal lines and a backward direction from the other ends thereof, and
wherein the circuit block further includes a fifth transistor that has a gate being connected to the first node and controls electrical conduction between the second node and the third clock signal line in a reverse direction.

6. A display device comprising:
a plurality of pixels
a plurality of scanning signal lines supplying a scanning signal to the plurality of pixels respectively,
a driving circuit sequentially applying the scanning signal from one ends of the plurality of scanning signal lines,
a plurality of output circuits outputting the scanning signal to the plurality of scanning signal lines,
a first clock signal line supplying a first clock signal to the driving circuit,
a third clock signal line supplying a third clock signal to the driving circuit,
wherein the output circuit has a first transistor, a second transistor, a third transistor, and a fourth transistor,
wherein the first transistor has a gate connecting to a first node, an input electrode connecting the first clock signal line, and an output electrode connecting to the scanning signal line,
wherein the first node becomes an active potential during an output period including a period in which the scanning signal is applied to the corresponding scanning signal line,
a second transistor has a gate connecting to a second node, an input electrode connecting the first node, and an output electrode connecting an inactive potential line,
wherein the second node becomes an active potential during a non-output period which is a period other than the output period,
a third transistor has a gate connecting to the first node, an input electrode connecting the third clock signal line, and an output electrode connecting the second node,
a fourth transistor has a gate and an input electrode connecting the third clock signal line and an output electrode connecting the second node,
wherein the third clock signal has an active potential at the time of termination of the output period and an inactive potential during the output period.

7. The display device according to claim 6, wherein the third clock signal is a clock signal other than the first clock signal in multiphase clock signals including the first clock signal.

8. The display device according to claim 6, wherein the third clock signal is an output to the scanning signal line connecting another output circuit.

9. The display device according to claim 6, wherein the third clock signal line is connected to the third transistor through diode connection.

10. The display device according to claim 6,
wherein the driving circuit is a bidirectional driving circuit that sequentially applies the active potential in one direction selected from a forward direction from the one ends of the plurality of scanning signal lines and a backward direction from the other ends thereof, and
wherein the output circuit further includes a fifth transistor that has a gate being connected to the first node and controls electrical conduction between the second node and the third clock signal line in a reverse direction.

* * * * *